Figure 1:
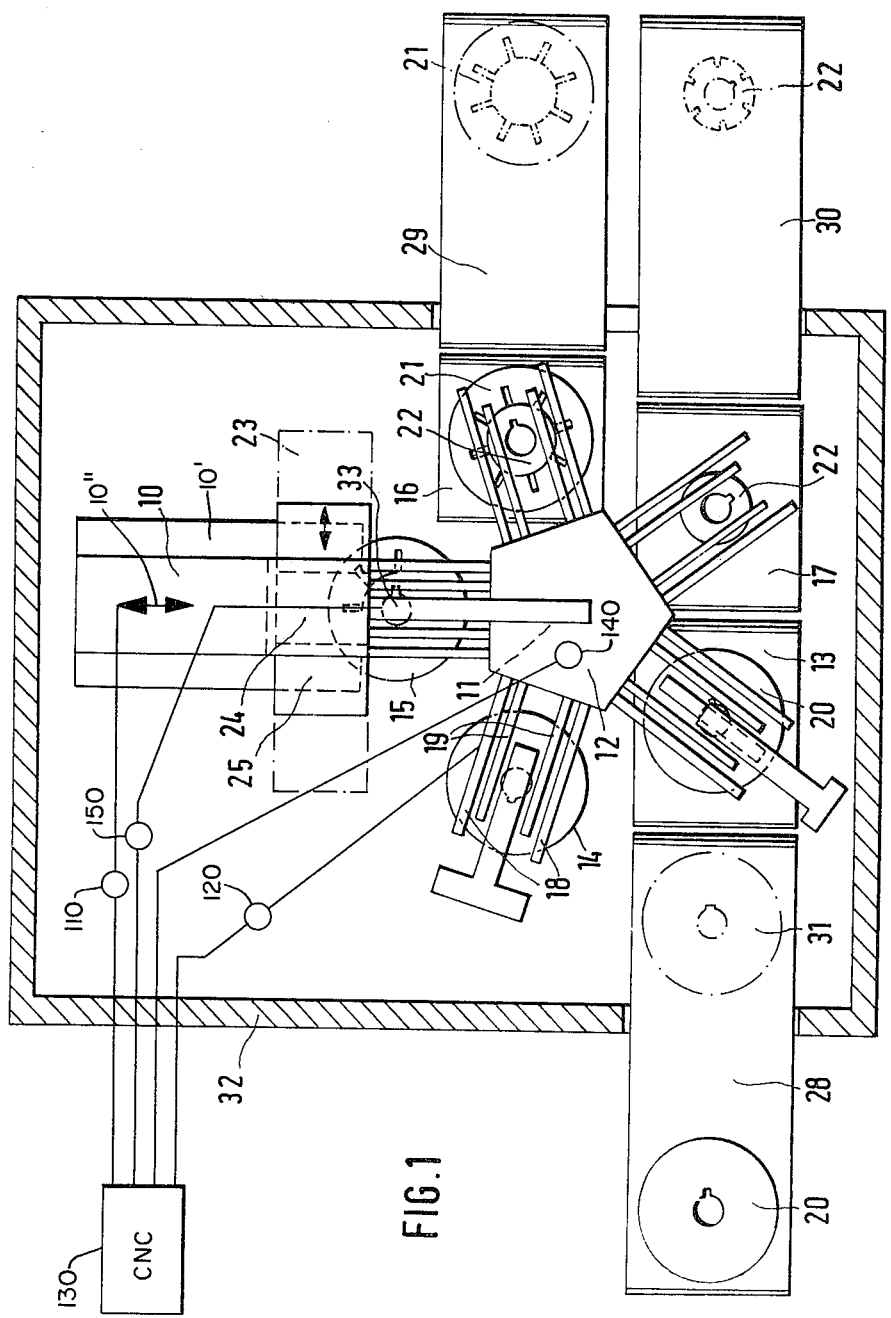

United States Patent [19]

Bergmann et al.

[11] 4,331,049

[45] May 25, 1982

[54] NUMERICALLY CONTROLLED AUTOMATIC NOTCHING PRESS

[75] Inventors: Ewald Bergmann, Rechberghausen; Hans-Martin Dommer, Göppingen, both of Fed. Rep. of Germany

[73] Assignee: L. Schuler GmbH, Göeppingen, Fed. Rep. of Germany

[21] Appl. No.: 13,062

[22] Filed: Feb. 21, 1979

[30] Foreign Application Priority Data

Feb. 18, 1978 [DE] Fed. Rep. of Germany ....... 2807066

[51] Int. Cl.³ .................... B21D 28/22; B26D 7/06
[52] U.S. Cl. ........................... 83/71; 83/79; 83/90; 83/154; 83/267; 83/405; 83/411 R; 83/560
[58] Field of Search ............... 83/71, 411 R, 405, 560, 83/90, 92, 267, 79, 154

[56] References Cited

U.S. PATENT DOCUMENTS

| 3,203,288 | 8/1965 | Blumer | 83/92 |
|---|---|---|---|
| 3,603,191 | 9/1971 | Muller et al. | 83/405 |
| 3,623,385 | 11/1971 | Schneider et al. | 83/405 |
| 3,835,744 | 9/1974 | Wendt | 83/560 |
| 4,108,031 | 8/1978 | Dangelmair et al. | 83/90 |
| 4,197,772 | 4/1980 | Anderson et al. | 83/411 R |

FOREIGN PATENT DOCUMENTS 2114430 3/1971 Fed. Rep. of Germany .... 83/411 R

Primary Examiner—Donald R. Schran
Attorney, Agent, or Firm—Craig & Antonelli

[57] ABSTRACT

An automatic numerically controlled slotting or notching press arrangement which includes a multi-armed feed and removing device having a turnstile or turntable which is selectively indexed or rotated so as to convey blanks to various processing stations. The feeding and removing device is adapted to transfer the blanks from at least one stack unloading station to a centering or aligning station, a locating or turning station, a processing station, a stator stacking station, and a rotor stacking station. A numerically controlled indexing unit (a clamping table for blanks to be processed) and a numerically controlled tool changing is provided. The stack unloading station and the rotor stacking station form the first and last processing stations and are linked by a conveying device which operates independently of the turnstile or turntable of the feeding and removing device.

14 Claims, 2 Drawing Figures

NUMERICALLY CONTROLLED AUTOMATIC NOTCHING PRESS

The present invention relates to a punching or notching arrangement and, more particularly, to a numerically controlled automatic punching or notching arrangement for punching out or notching blanks utilized for rotor and/or stator laminations of electrical machines with the arrangement including at least one slotting or notching machine, radially adjustable with respect to a blank to be notched or punched by an actuating drive, equipped with a stepwise rotatably driven component under numerical control and with a numerically controlled conventional tool changing device as well as a multi-armed feeding and removal device having a turnstile or turntable which is adapted to transfer the blanks to be processed between at least one stack unloading station, one centering locating and/or turning station, one processing station, one stator stacking station, and one rotor stacking station.

An arrangement for punching out laminations for cone armature motors is proposed in, for example, Offenlegungsschrift No. 21 54 003, wherein a slotting machine is provided and disposed so as to be moved radially with respect to an axis of rotation of a blank supporting table by means of a separate adjusting drive in order to insure that the diameters of the circular laminations are matched for each blank.

In German Patentschrift No. 1 627 227, a numerically controlled segment slotter is proposed wherein the rotational axis of the blank support table is movable radially with respect to a center of rotation of such rotational axis in two directions at right angles to each other.

German Patentschrift No. 2 108 231 also proposes a numerically controlled segment slotter; however, the axis of rotation of the blank support table is shifted away from the blank support table in a direction toward the slotting machine or, more exactly, shifted away into the area of a punch tool.

In Auslegeschrift No. 24 11 439, a numerically controlled segment slotter is proposed in which the rotational axis of the blank support table is movable in one direction with the slotting machine itself being movable in another direction at right angles to the rotational axis of the blank support table.

In Offenlegungsschrift No. 25 27 982 an automatic notching machine is proposed which includes a notching press and a five-armed feed and discharge device constructed as a turnstile or turntable having magnetic conveying rails which are switchable by way of a control means. An automatic notching press of this type is normally employed to produce, for example, notched stator laminations from un-notched blanks and un-notched rotor laminations separated from the stator laminations for electric machines.

In the last-mentioned notching press construction, the un-notched blanks are turned on a stacking pin into a stack unload station by means of a turntable, are unloaded and then fed to a centering, locating, and/or turning station by means of the feed and discharge device. The centering, locating, and/or turning station is followed by a processing station in which the stator blank is notched by means of the notching press and separated from the rotor lamination. The notched stator lamination is stacked up on a pin of a turntable and the un-notched rotor lamination following this on a pin of a further turntable. The un-notched rotor laminations are taken off the pin of the rotor stacking station turntable and fed to an intermediate storage station from where they are conveyed to, for example, a further automatic notching press for notching of the rotor blanks. The notching presses can be moved by means of a numerically controlled actuating drive in order to permit diameter adjustments for the respective blanks.

For the production of complete bundles of laminations for electric machines, that is, of notched stator and rotor laminations, it has been proposed to combine two notching presses with one multi-armed feed and discharge device in automatic notching presses (German Journal TZ f. prakt. Metallbearbeitung, volume 62, year 1968, issue 3, pages 126 et seq.). The use of two notching presses makes these installations very expensive and also makes for long set-up time when refitting the automatic notching presses for other tools, that is, when other types of electric machines are to be produced.

In Offenlegungsschrift No. 22 22 582, an automatic notching press with a feed and discharge device is proposed with the feed and discharge device being arranged linearly and with elevating platforms which are, for example, combined with chain conveyors, being employed instead of turntables or rotating magazines so that, with similar action, stack unloading and stacking stations are provided.

Additionally, in the aforementioned journal, a notching or punching machine is described which is equipped with a numerically controlled tool changing device, preferably, a tool changing turret.

Additionally, in commonly assigned U.S. application Ser. No. 961,246, an arrangement for notching circular blanks is proposed which arrangement includes at least one notching machine, a rotatably mounted table means for supporting the blanks at the notching machine, and an adjusting drive means for adjusting the notching machine in a first direction of movement radially with respect to a spatially fixed axis of rotation of the supporting table means. An additional adjusting means is provided for selectively driving the supporting table means with means being provided for enabling a relative movement between the supporting table means and the at least one notching machine in a second direction of movement at a right angle to the first direction of movement. By virtue of this construction, an automatic arrangement for punching out or slotting circular blanks so as to form stator and/or rotor laminations by way of conventional slotting machines is achieved whereby stacks of laminations are produced which may have spiral or oblique slots.

The aim underlying the present invention essentially resides in providing an automatic notching press with a multi-armed feed and discharge means on which completely slotted bundles of stator and/or rotor laminations can be produced utilizing a notching or slotting press.

In accordance with features of the present invention, a numerically controlled automatic notching press is provided which includes a multi-armed feed and discharge means adapted to transfer blanks between various processing stations including a stack unloading station and a rotor stacking station with a conveyor means being provided for connecting the stack unloading station and rotor stacking station which conveyor means is independent of the turnstile or turntable of the multi-armed feeding and discharge means.

In accordance with further features of the present invention, the stack unloading station, a stator stacking station, and the rotor stacking station are constructed by means of elevating platforms with at least the elevating platforms of the stack unloading station and the rotor stacking station being equipped with horizontal conveyor means which can be driven independently of each other.

Furthermore, according to the present invention, the elevating platform of the stator stacking station is equipped with a horizontal conveyor and all the elevating platforms may be combined with conveyors which are stationary in the vertical direction and act linearly in a horizontal direction.

In accordance with yet further features of the present invention, the conveyor which may be combined with the elevating platform of the stack unloading station is equipped with an intermediate storage area. The feed and discharge means may be connected in a conventional manner, with magnetic conveying rails which are adapted to be selectively switched by suitable control means so that the spacing of the magnetic conveying rails with respect to each other is adjustable centrally for each diameter of the stator and rotor blanks.

The advantages of the automatic notching press in accordance with the present invention, can be seen in its economic efficiency, the determining factors to be considered being short refitting or retooling times by virtue of the use of numerically controlled tool changing devices, the use of an indexing unit controlled numerically in the widest sense, and the use of only one notching press which can be moved by means of an actuating drive for the adjustment of diameters of the respective blanks.

Moreover, the automatic notching press arrangement of the present invention provides an optimum solution both with respect to arrangement, equipment, control, and operation by virtue of the use of a multi-armed turnstile or turntable for the feed and discharge means combined with elevating platforms for the stack unloading and stacking stations and by virtue of the utilization of a conveyor which is independent of the turnstile which conveyor joins the rotor stacking station and the stack unloading station.

Accordingly, it is an object of the present invention to provide an automatic notching or slotting press arrangement which avoids by simple means shortcomings and disadvantages encountered in the prior art.

Another object of the present invention resides in providing a slotting or notching press arrangement in which means are provided for linking the first and last processing stations independently of the operation of the blank transferring means.

A still further object of the present invention resides in providing an automatic press notching arrangement which is numerically controlled.

A still further object of the present invention resides in providing an automatic notching or slotting press arrangement which functions reliably under all operating conditions.

Figure 2:
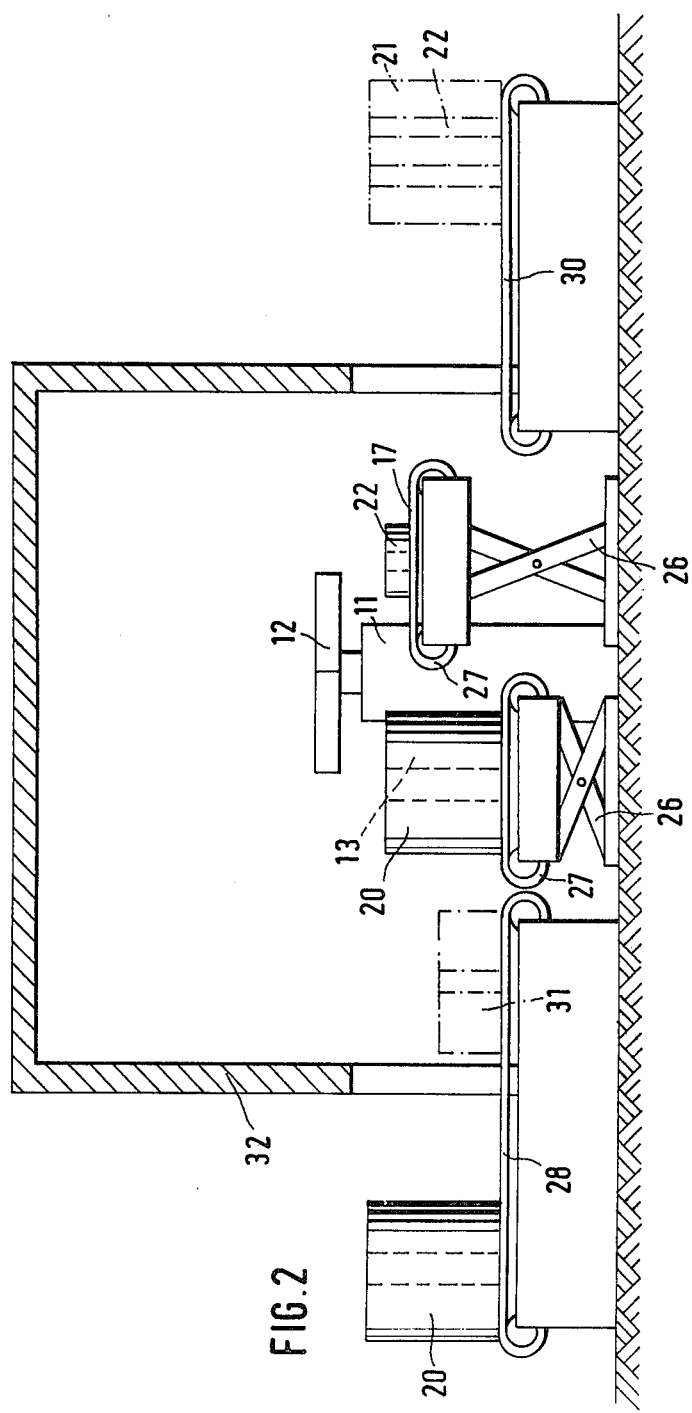

These and other objects, features, and advantages of the present invention will become more apparent from the following description when taken in connection with the accompanying drawings which show, for the purposes of illustration only, one embodiment in accordance with the present invention, and wherein:

FIG. 1 is a partially schematic plan view of an automatic notching or slotting press in accordance with the present invention; and FIG. 2 is a partially schematic frontal view of the arrangement of FIG. 1.

Referring now to the drawings wherein like reference numerals are used in both views to designate like parts and, more particularly, to FIG. 1, the notching or slotting press arrangement includes a notching or slotting machine 10, supported on a bench 10', and a five-armed feeding and removal device 11 constructed as an indexing spider for automatically feeding and removing blanks to and from the slotting machine 10. The slotting machine 10 is adjustable radially with respect to the blank being processed in a direction of movement designated by the reference numeral 10', by means of a conventional adjustable drive 110 which is connected with a numerical control system 130.

The five-armed feeding and removal device 11 is constructed as an indexing spider and is adapted to automatically feed, remove, and transport blanks to various processing stations. For this purpose, the five-armed feeding and removing device 11 includes a turnstile or turntable 12 which is adapted to transfer blanks between a stack unloading station 13, a centering locating, and/or turning station 14, a processing station 15, a stator stacking station 16, and a rotor stacking station 17.

To accommodate various diameters of stator laminations and rotor laminations, the feed and discharge device 11 is provided with magnetic conveying rails 18, 19 which are switchable or adjustable by suitable control means so that both un-notched blanks 20 and stator laminations 21 as well as rotor laminations 22 can be transported. The magnetic conveying rails 18 are adapted to be set for predetermined diameters of the stator laminations 21 and the conveying rails 19 are adapted to be set for predetermined diameters of the rotor laminations 22. For this purpose, a central actuating drive 120 is provided which is connected with the numerical control system 130.

A numerically controlled tool changing device 23, such as, for example, a rotatable turret or the like, is provided on the notching press 10 with the tool changing device 23 being connected with the numerical control system 130. The tool changing device 23 may, for example, include a stator notching or separating tool 24 and a rotor notching tool 25. As can be appreciated, the tool changing device 23 may be configured more comprehensively and contain, for example, tools for other notch shapes and/or ventilation slots.

As shown in FIG. 2, the stack unloading station 13 and the rotor stacking station 17 each include an elevating truck or platform 26. Each of the elevating trucks or platforms 26 includes conveying devices in the form of, for example, horizontal conveyors which are adapted to be driven by suitable drive means (not shown) independently of the turntable or turnstile 12. The elevating platforms 26 and horizontal conveyors 27 form a link between the rotor stacking station 17 and the stack unloading station 13 in a manner more fully described hereinbelow.

The stator stacking station 16 is provided with a horizontal conveyor 27 in a manner not shown in the drawings. Stationary conveyors 28, 29, and 30 are provided for linearly horizontally conveying the blanks and/or laminations. The conveyors 28, 29, 30 are arranged in direct connection with the stack unloading station 13, the stator stacking station 16 (FIG. 1) and the rotor stacking station 17 for the purposes of fully automating the production process.

After processing of the blanks, finished bundles of stator laminations 21 and rotor laminations 22 are transferred by means of the conveyors 29, 30 from the horizontal conveyors 27 of the elevating platforms 26 of the rotor stacking station 17 and stator stacking station 16 whereby the bundles of laminations 21, 22 are available or removal for subsequent bundling, welding, or other processing. The conveyor 28 for the stack unloading station 13 may be constructed in such a manner that it provides for an intermediate storage station 31 the function of which will be explained more fully hereinafter.

To provide for effective noise attenuation, the automatic slotting or notching press arrangement is surrounded by a sound-proofing cabin 32 or enclosure with the feeding and removing of the un-notched blanks and finished stator laminations 21 and rotor laminations 22 being carried out through noise locks such as described in, for example, Offenlegungsschrift No. 23 65 033. The entire automatic notching press arrangement described hereinabove is wholly controlled by the numerical control system 130 which is preferably a CNC control system.

The operation of the slotting or notching press arrangement during one working cycle is as follows:

The conveyor 28 transports or conveys un-notched blanks 20 to the elevating platform 26 of the stack unloading station 13. The blanks 20 in the stack unloading station 13 are unstacked in a conventional manner by the magnetic conveying rails 18, 19 and fed, by an indexing of the feeding and removing device 11 driven by conventional means 140, to the centering, locating and/or turning station 14. At the station 14, the blanks 20 undergo a dual blank check and blank thickness measurement as well as a centering, locating and/or turning so as to properly position the blanks 20 for further processing in the processing station 15. The blank thickness measurement is used to determine the height of the bundles for stator laminations and rotor laminations 22.

From the station 14, the blanks 20 are conveyed by a further indexing of the feeding and removing device 11 into the processing station 15 where a stationary indexing unit 33 accepts the blank 20. In the illustrated embodiment, the indexing unit 33 is driven by a numerically controlled actuating drive 150; however, it is also possible to drive the indexing unit by the slotting or notching press 10 by way of a conventional mechanical linkage (not shown) with the indexing of the indexing unit 33 being very possibly by a numerically controlled change of gears.

In the processing station 15, the slotting or notching press 10 is operated whereby the stator laminations 21 are notched and separated from the rotor laminations 22 by the stator notching and separating tool 24. The feeding and removing device 11 is once again indexed so that the notched stator laminations 21 and un-notched rotor laminations are conveyed jointly out of the processing station 15 by means of the magnetic conveying rails 18 and 19 with the finished stator laminations 21 being stacked on the elevating platform 26 of the stator stacking station 16 while the un-notched rotor laminations 22 are stacked on the elevating platform 26 of the rotor stacking station 17.

As soon as a bundle of stator laminations is completed, the automatic notching or slotting press arrangement is stopped and any un-notched blanks 20 still lying in the stack unloading station 13 are conveyed by the conveyor 27 of the platform 26 of the unloading station 13 to the intermediate storage station 31 with the finished notched stator laminations then being removed from the stator stacking station 16 by means of the horizontal conveyor 27 of the stator stacking station 16 and the conveyor 29. The un-notched rotor laminations 22 are then conveyed by way of the horizontal conveyor 27 of the rotor stacking station 17 to the horizontal conveyor 27 of the stack unloading station 13. The tool changing device 23 is operated and the stator notching and separating tool 24 is exchanged or replaced by a rotor notching tool 25. The conveying of the un-notched rotors 22 to the unloading station 13 and the changing of the tool by the tool changing device 23 as well as, for example, the conveying of the un-notched blanks 20 to the storage station 31 and conveyance of the finished notched stator laminations 21 can be effected simultaneously by virtue of the control of the numerical control system 130.

The un-notched rotor laminations 22 in the stack unloading station 13 are then unstacked thereat and transferred by the feeding and removing device 11 to the stations 14, 15, and 17 whereby the un-notched rotor laminations 22 is aligned or located, subsequently notched, and finally stacked up in the rotor stacking station 17. After a bundle of rotor laminations 22 is completed, the bundle is removed by means of the conveyor 30 in the same manner as the stator laminations 21. In this way, complete bundles of matching stator laminations 21 and rotor laminations 22 for electric machines can be obtained and can be immediately further processed in a bundling and/or welding station. While the description hereinabove indicates two passes for the blanks 20 (21, 22) through the arrangement, it is also possible to have three or more passes to, for example, produce ventilation slots.

It is also possible for the blank 20 to be clamped onto the indexing unit 33 only once for processing, that is, in order to produce bundles of finished stator laminations 21 and rotor laminations 22. For this purpose, the tool changing device 23 would have to be operated a number of times for each blank instead of once per bundle.

It is also possible to construct the rotor stacking station 17 as a stack unloading station. In this manner, it would not be necessary to convey the un-notched rotor laminations 22 but the stator stacking station must also be capable of accepting notched rotor laminations 22.

As shown in FIG. 2, the elevating trucks or platforms 26 are selectively displaceable by conventional means (not shown) between a lower position in alignment with the conveyors 28, 30 to an upper position. By virtue of the displaceability of the platforms 26, the unloading at the stack unloading station 13 as well as the loading at the rotor and stator stacking stations 17, 16 is facilitated. More particularly, by controlling the displacement means by the numerical control system 130, the elevating platform 26 at the stack unloading station 13 can be progressively raised as the blanks 20 are removed from the stack of blanks and conveyed to the other processing stations. Likewise, the platforms 26 at the rotor and stator lamination stacking stations 17, 16 can be progressively lowered as the finished laminations are transferred to the respective stations. As is apparent, during a transfer of the un-notched stator laminations from the rotor stacking station 17 to the stack unloading station 13, the platforms 26 of the respective stations 17, 13 are brought into alignment.

The automatic slotting or notching press arrangement according to the present invention makes it possible to produce finished bundles of stator laminations 21 and rotor laminations 22 automatically by means of one notching press 10 while avoiding the use of intermediate storage stations. Moreover, special motors such as motors with conical armatures can also be produced automatically with the notching or slotting press arrangement of the present invention and the associated CNC control system.

While we have shown and described only one embodiment in accordance with the present invention, it is understood that the same is not limited thereto, but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A numerically controlled automatic notching arrangement for notching blanks, the arrangement comprising at least one stack unloading station, an aligning station, a processing station, a first stacking station and a second stacking station, at least one notching machine having a numerically controlled tool changing means, and a multi-armed feeding and removing means including an indexable turntable for conveying blanks between at least one said stack unloading station, said aligning station, said processing station, said first stacking station and said second stacking station, characterized in that conveyor means are provided for linking the stack unloading station with the second stacking station, said conveyor means being driven independently of the indexable turntable whereby blanks may be selectively conveyed from the second stacking station to the stack unloading station.

2. An arrangement according to claim 1, characterized in that means are provided for adjusting the at least one notching machine radially with respect to a blank to be processed.

3. An arrangement according to claim 2, characterized in that the adjusting means includes a numerically controlled stepwise rotatably driven component.

4. An arrangement according to claim 3, characterized in that the second stacking station is a rotor stacking station, and in that the stack unloading station and rotor stacking station each include an elevating platform, the conveyor means includes individual horizontal conveyors disposed at the respective platforms, the individual horizontal conveyors are adapted to be driven independently of each other.

5. An arrangement according to claim 4, characterized in that the first stacking station is a stator stacking station, and in that the stator stacking station includes an elevating platform provided with a horizontal conveyor adapted to be driven independently of the horizontal conveyors of the stack unloading station and the rotor stacking station.

6. An arrangement according to claim 5, characterized in that further conveyor means are provided for linearly horizontally conveying blanks to and from the stack unloading station and from the respective stator stacking station and rotor stacking station.

7. An arrangement according to claim 6, characterized in that the further conveyor means for conveying blanks to and from the stack unloading station includes an intermediate storage area.

8. An arrangement according to claim 7, characterized in that the second stacking station is a rotor stacking station, and in that the stack unloading station and rotor stacking station each include an elevating platform, the conveyor means includes individual horizontal conveyors disposed at the respective platforms, the individual horizontal conveyors are adapted to be driven independently of each other.

9. An arrangement according to claim 8, characterized in that the first stacking station is a stator stacking station, and in that the stator stacking station includes an elevating platform provided with a horizontal conveyor adapted to be driven independently of the horizontal conveyors of the stack unloading station and the rotor stacking station.

10. An arrangement according to claim 9, characterized in that further conveyor means are provided for linearly horizontally conveying blanks to and from the stack unloading station and from the respective stator stacking station and rotor stacking station.

11. An arrangement according to claim 1, characterized in that the stack unloading station and the second stacking station each include an elevating platform, the conveyor means includes individual horizontal conveyors disposed at the respective platforms, and in that the individual horizontal conveyors are adapted to be driven independently of each other.

12. An arrangement according to claim 11, characterized in that the first stacking station includes an elevating platform provided with a horizontal conveyor adapted to be driven independently of the horizontal conveyors of the stack unloading station and the second stacking station.

13. An arrangement according to claim 12, characterized in that further conveyor means are provided for linearly horizontally conveying blanks to and from the stack unloading station and from the respective first and second stacking stations.

14. An arrangement according to claim 13, characterized in that the further conveyor means for conveying blanks to and from the stack unloading station includes an intermediate storage area.

* * * * *